(12) United States Patent
Ogura et al.

(10) Patent No.: US 6,817,103 B2
(45) Date of Patent: Nov. 16, 2004

(54) BONDED LAYER PROTECTION STRUCTURE FOR WEAR RESISTANT COMPONENT

(75) Inventors: Norio Ogura, Niwa-gun (JP); Hisayasu Watanabe, Niwa-gun (JP); Takema Isogaya, Niwa-gun (JP)

(73) Assignee: Kanefusa Kabushiki Kaisha, Aichi (JP)

( * ) Notice: Subject to any disclaimer, the term of this patent is extended or adjusted under 35 U.S.C. 154(b) by 130 days.

(21) Appl. No.: 10/106,643

(22) Filed: Mar. 26, 2002

(65) Prior Publication Data
US 2002/0139486 A1 Oct. 3, 2002

(30) Foreign Application Priority Data
Mar. 29, 2001 (JP) ......................................... 2001-097329

(51) Int. Cl.[7] .......................... B26B 13/04; B26B 27/00
(52) U.S. Cl. ......................... 30/346.54; 30/350; 30/357
(58) Field of Search ................... 30/357, 350, 346.54; 428/421, 422, 427, 446, 457

(56) References Cited

U.S. PATENT DOCUMENTS

| 5,787,773 A | * | 8/1998 | Penoza | 83/13 |
| 6,076,264 A | * | 6/2000 | Meckel | 30/225 |
| 6,422,110 B1 | * | 7/2002 | Wurst et al. | 76/104.1 |

* cited by examiner

Primary Examiner—Ramsey Zacharia
(74) Attorney, Agent, or Firm—Koda & Androlia (57) ABSTRACT

A bonded layer protection structure of a wear resistant component, comprising a wear resistant component such as a cutting tool constructed by bonding a wear resistant member such as a cutting portion to a main body portion such as a base metal by an adhesive. In this case, a necessary part of an adhesive layer exposed portion in a bonded portion between the wear resistant member and the main body portion is covered with a filler or a covering material. In addition, in the wear resistant component such as the cutting tool, a necessary part of the adhesive layer exposed portion in the bonded portion between the wear resistant member and the main body portion is covered with a sticking member.

3 Claims, 8 Drawing Sheets

BONDED LAYER PROTECTION STRUCTURE FOR WEAR RESISTANT COMPONENT

FIELD OF THE INVENTION

The present invention relates to a bonded layer protection structure for a wear resistant component. More specifically, the invention relates to a bonded layer protection structure, which can be put to sufficient practical use in place of conventional solder bonding by increasing resistances to water and chemicals of a portion bonded by an adhesive between a cutting portion as a wear resistant member and a base metal as a main body portion in a wear resistant component such as a cutting tool.

DESCRIPTION OF THE RELATED ART

Figure 11:
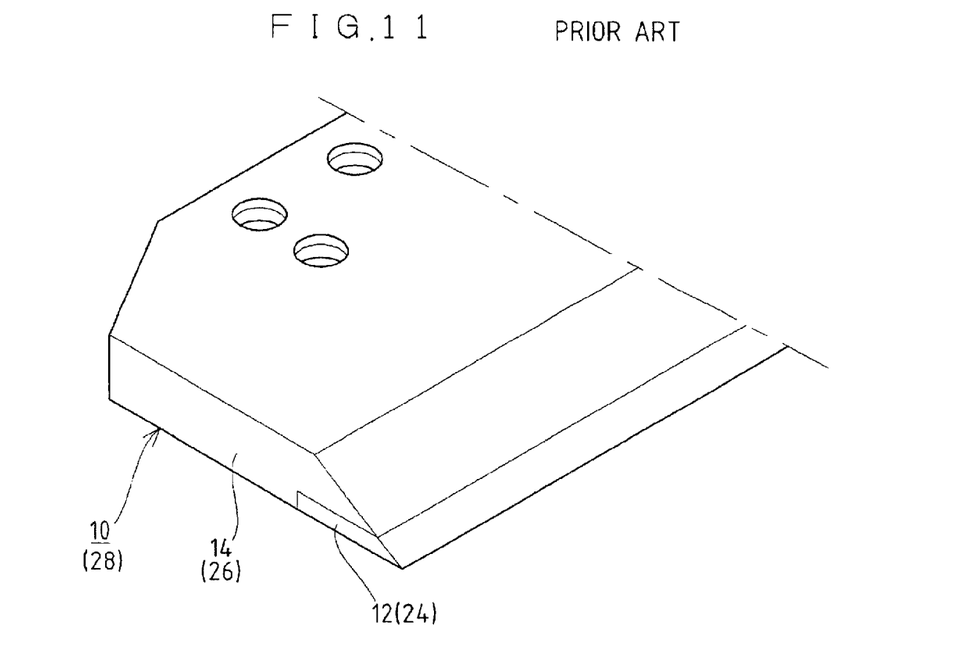
FIG. 11 is a partially omitted perspective view of a cutting blade used for a bookbinder or the like, showing a structure where a cutting portion is soldered to a base metal.
Figure 12:
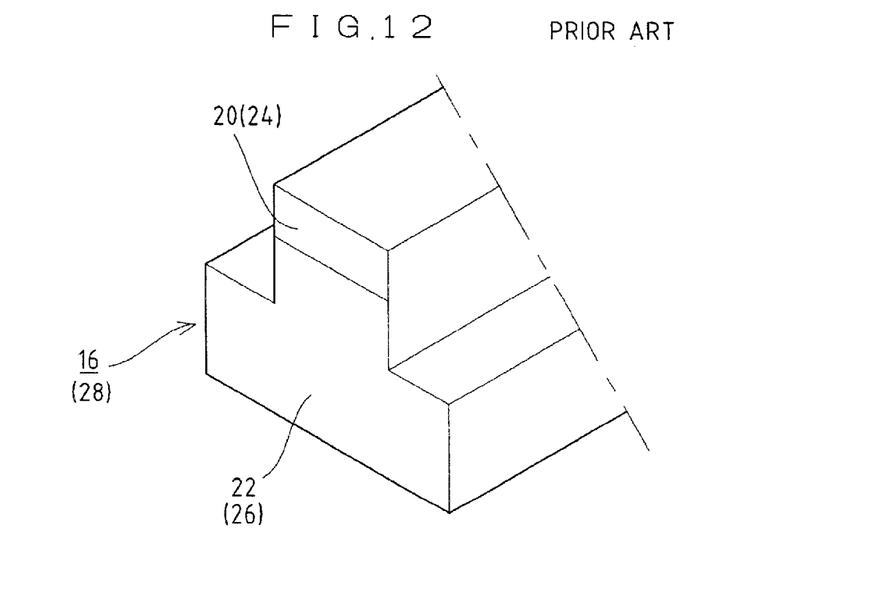
FIG. 12 is a partially omitted perspective view of a slide rail for supporting a heavy article to be freely slid, showing a structure where a blade is soldered to a rail-shaped member.
Figure 13:
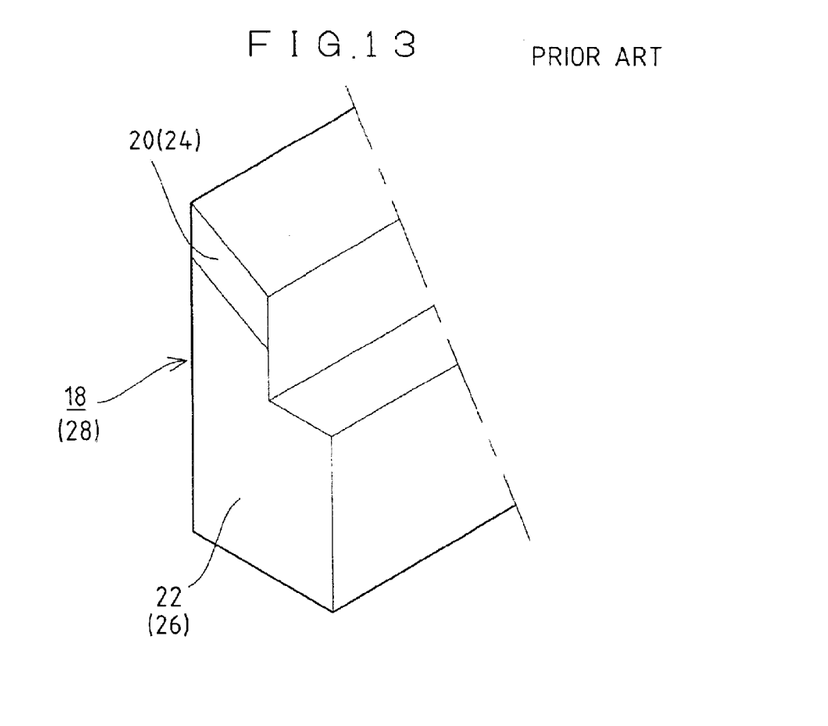
FIG. 13 is a partially omitted perspective view of a work rest used for a centerless grinding machine, showing a structure where a blade is soldered to a rail-shaped member.

For example as shown in FIG. 11, a knife-shaped cutting blade 10 used for a bookbinder or a paper machine tool is constructed by bonding a cutting portion 12 made of high-speed tool steel or the like to a base metal 14 made of common steel. In addition, a slide rail 16 for supporting a structure to be freely slid shown in FIG. 12, and a work rest 18 for supporting various works used for, for example a centerless grinding machine shown in FIG. 13 both have structures, where highly wear resistant blades 20 made of sintered hard alloys or the like are bonded to rail-shaped members 22. Generally, the cutting portion 12 and the blade 20 (referred to as "wear resistance member 24", hereinafter), and the base metal 14 and the rail-shaped member 22 (referred to as "main body portion 26", hereinafter) are soldered together by using silver solder, copper solder or the like. The above-described cutting blade 10, the slide rail 26 and the work rest 18 are cutting tools or the like having high resistances to wear, which are constructed by bonding the wear resistant member 24 to the main body portion 26 of the base metal or the like, and these are generically referred to as "wear resistant component 28" hereinafter.

The wear resistant component 28 such as a cutting tool or the like constructed by bonding the wear resistant member 24 such as the cutting portion to the main body portion 26 such as the base metal is heated to about 800° C. in soldering even when low-temperature silver solder is used. However, since the wear resistant member 24 as a material to be bonded and the main body portion 26 have intrinsic coefficients of thermal expansion, which are different from each other, heat distortion in an entire portion by the heating, cracks in the wear resistant member 24 and other problems inevitably occur. Thus, in the wear resistant component 28, when the wear resistant member 24 is soldered to the main body portion 26, it is necessary to suppress the occurrence of heat distortion as much as possible, and execute careful temperature control to prevent cracks. Accordingly, a worker needs long-time experience and skills.

Figure 14:
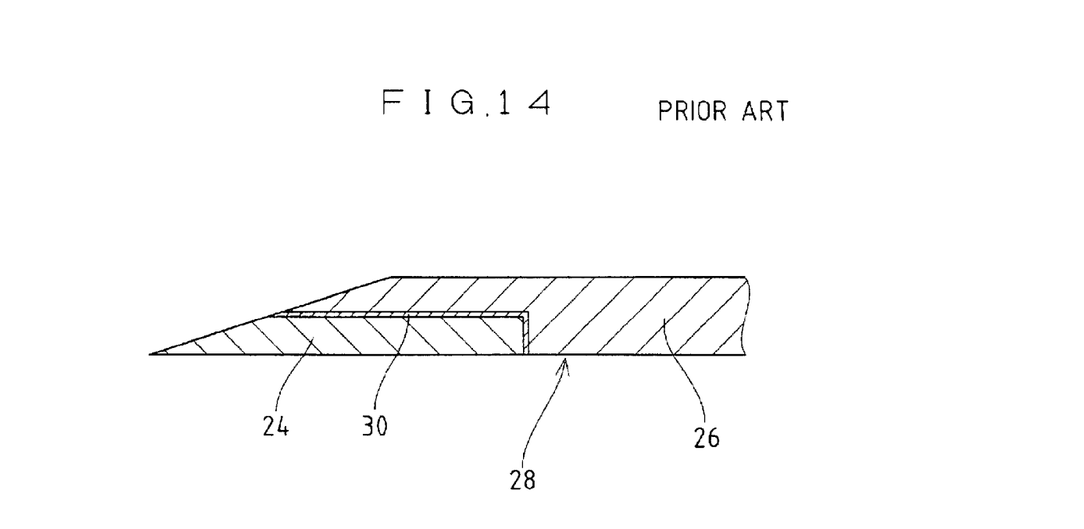
FIG. 14 is a partially omitted perspective view of a cutting blade constructed by bonding a cutting portion to a base metal by an adhesive.

Therefore, as shown in FIG. 14, for example, regarding the cutting tool 28 as the wear resistant component, an attempt has been made to bond the cutting portion 24 to the base metal 26 by an adhesive 30 and to put to practical use. In the case of this bonding by the adhesive, different from the case of the above-described soldering, heating exceeding 200° C. is not carried out, and the work is basically carried out in a range of a normal temperature to 200° C. or lower. Thus, no problems such as the above-described heat distortion or cracks occur. However, compared with the soldering, adhesive strength between the cutting portion 24 and the base metal 26 was not sufficient, this bonding by the adhesive has not yet been put to wide practical use. With recent improvements in adhesive, however, by selecting a type of adhesive, and securing a relatively large bonding area between the cutting portion 24 and the base metal 26, it is now possible to bond the cutting portion 24 to the base metal 26 with sufficient strength.

However, even for the cutting tool 28 constructed by bonding the cutting portion 24 to the base metal 26 by the adhesive 30, when the cutting portion 24 is worn with time because of use, the cutting portion 24 is removed from the cutting machine or the like each time, and subjected to repeated grinding. In this event, since a layer of the adhesive 30 is partially exposed in the bonded portion between the cutting portion 24 and the base metal 26, the exposed portion of the adhesive 30 is eroded by a grinding solution used for grinding, and deterioration gradually progresses. That is, even in the case of the adhesive for strongly bonding metal materials, resistances to water and chemicals have not yet been satisfactory. Thus, in the bonded portion between the cutting portion 24 and the base metal 26, where the adhesive 30 low in water and chemical resistances is exposed, as a result of being exposed to the grinding solution in grinding, peripheral adhesive strength is inevitably lowered. The adhesive has low reliability in terms of durability for long-time use, and thus the adhesive has not been put to practical use for bonding in the wear resistant component 28 such as the cutting tool having the wear resistant member 24 such as a cutting portion bonded to the main body portion 26 of the base metal or the like.

In addition, as described above, even if both members 24 and 26 can be bonded together by the adhesive 30 with strength necessary for the cutting tool 28 by securing a large bonding area between the cutting portion 24 and the base metal 26, compared with the above-described soldering, the bonding strength is usually lower. Consequently, when the cutting portion 24 is worn by repeated grinding, it is extremely dangerous to replace a cutter by another with a wear situation about equal to that during the conventional soldering set as a reference. When the cutting portion 24 is bonded to the base metal 26 by the adhesive 30, a large bonding area must be secured therefore. However, since the wear of the cutting portion 24 is always accompanied by wearing-out of the bonded portion, bonding strength of the adhesive is correspondingly lowered. Thus, in the case of the cutting tool 28 bonding the cutting portion 24 to the base metal 26 by the adhesive 30, a target of one type or another must be provided to clearly show a limit of use with consideration given to safety of a certain level. However, no presentations have been made yet to realize such.

SUMMARY OF THE INVENTION

The present invention was made to suitably solve the foregoing problems inherent in the wear resistant component such as a cutting tool constructed by bonding the wear resistant member such as s cutting portion to the main body portion such as a base metal. An object of the invention is to provide a protection structure for a bonded layer, which can be put to sufficient practical use in place of conventional soldering by increasing resistances to water and chemicals of an exposed portion of adhesive in the bonded layer. Another object of the invention is to provide means for clearly showing a limit of use with time of a wear resistant member effectively in a wear resistant component such as a cutting tool constructed by bonding a wear resistant member such as a cutting portion to a main body such as a base metal by adhesive.

In order to solve the above-described problem, and achieve the original object, in accordance with an aspect of the present invention, there is provided a bonded layer protection structure of a wear resistant component, comprising: a wear resistant component such as a cutting tool constructed by banding a wear resistant member such as a cutting portion to a main body portion such as a base metal by an adhesive. In this vase, a necessity part of an adhesive layer exposed portion in a bonded portion between the wear resistant member and the main body portion is covered with a filler or a covering material. For the filler, an adhesive having a resistance to water and/or a resistance to chemicals, or a silicon-containing caulking material is suitably used. For the covering material, a coating material having a resistance to water and/or a resistance to chemicals, a coating film of metal foil or a fluorocarbon resin, or a film by plating is suitably used.

In order to solve the above-described problem, and achieve the original object, in accordance with another aspect of the invention, there is provided a bonded layer protection structure of a wear resistant component, comprising: a wear resistant component such as a cutting tool constructed by bonding a wear resistant member such as a cutting portion to a main body portion such as a base metal by an adhesive. In this case, a necessary part of an adhesive layer exposed portion in a bonded portion between the wear resistance member and the main body portion is covered with a sticking member. For the sticking member, a plate-like, bar-like or piece-like metal member having a resistance to water and/or a resistance to chemicals is suitably used, and the sticking member is stuck to the adhesive layer exposed portion by adhesion or burying.

In order to solve the above-described problem, and achieve the original object, in accordance with yet another aspect of the invention, in the bonded layer protection structure of a wear resistant component, a marking indicating a limit of use is provided on at least one surface of the wear resistant member, before sufficient bonding strength cannot be secured because of a reduction in a bonding area of adhesive caused by frequent use or sharpen repairing, or the wear resistant member becomes thin to be broken off. The filler, the covering material or the sticking member itself may serve as such a marking indicating a limit of use of the wear resistant component.

DETAILED DESCRIPTION OF THE PREFERRED EMBODIMENTS

Next, description will be made of the preferred embodiments of bonded layer protection structures of wear resistant components of the present invention with reference to the accompanying drawings. Members identical or similar to those described above with reference to FIGS. 11 to 14 are denoted by similar reference numerals, and description thereof will be omitted. In addition, as wear resistant components such as cutting tools, a knife-shaped cutting blade used for a bookbinder or a paper machine tool, a slide rail for supporting a structure to be freely slid, and a work rest used for a centerless grinding machine will be illustrated. Needless to say, however, the invention is not limited to such components.

First Embodiment

Figure 1:
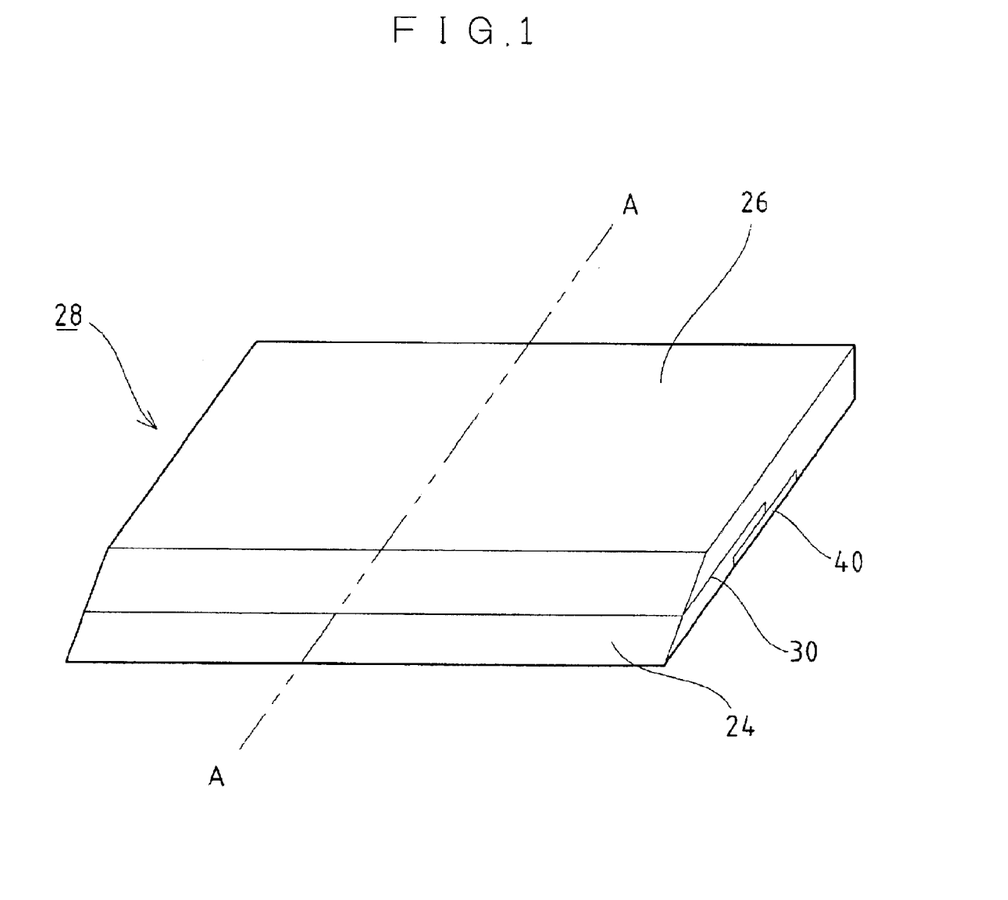
FIG. 1 is a perspective view of a bonded layer protection structure of a cutting blade according to a first embodiment of the present invention, showing a state where a cutting portion of the cutting blade is bonded to a base metal by an adhesive.
Figure 2:
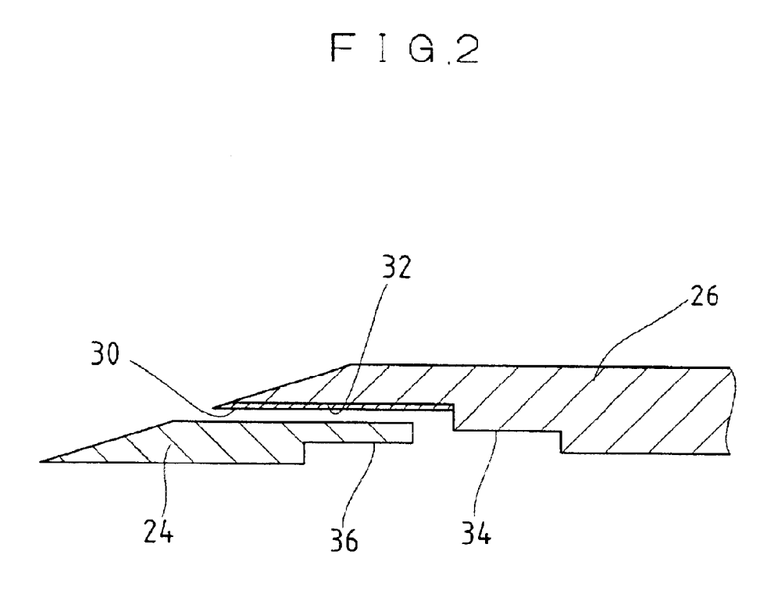
FIG. 2 is a side view of the cutting blade of FIG. 1, showing a state immediately before the cutting portion is bonded to the base metal.
Figure 3:
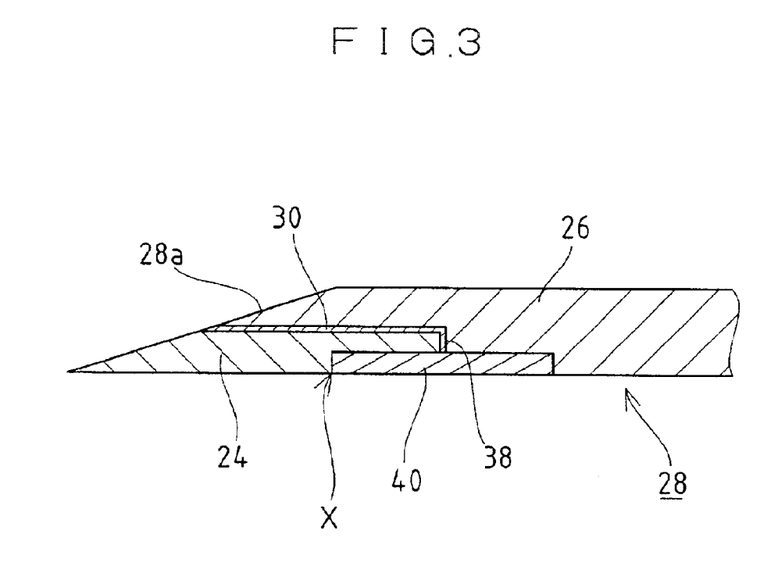
FIG. 3 is a sectional view taken along the line A—A of FIG. 1.

FIG. 1 is a schematic perspective view of a cutting blade 28 as the above-described wear resistant component. This cutting blade 28 has a structure where a plate-shaped cutting portion 24 as a wear resistant member is bonded to a base metal 26 as a main body by an adhesive 30. That is, as can be understood from FIG. 2 showing a state immediately before the cutting portion 24 is bonded to the base metal 26, in a backside of the base metal 26 made of common steel, a base portion 32 is recessed to receive the cutting portion 24 made of high-speed tool steel or a sintered hard alloy. A depth of this base portion 32 is set to a dimension slightly smaller than a thickness of the plate-shaped cutting portion 24. After the adhesive 30 is coated on the base portion 32, by pressing a backside of the cutting portion 24 to abut on the base portion 32, the cutting portion 24 and the base metal 26 are bonded together as shown in FIG. 3. For this adhesive 30, any types can be used as long as they provide high strength to bond metal materials to each other, and it includes an epoxy-containing thermosetting type, an ultraviolet curing type, or a two-liquid mixture type. To obtain maximum bonding strength of the adhesive, an area of the base portion 32 as a place for adhesive coating is set to a dimension as large as possible.

Also, in the backside of the base metal 26 shown in FIG. 2, a second base portion 34 is recessed by a required width so as to be continuous from the base portion 32 and deeper than the same. In addition, in the backside of the cutting portion 24, a third base portion 36 is recessed by a required width so as to be set to a dimension of a depth equal to that of the second base portion 34 in a place aligned with the second base portion 34 when the cutting portion 24 is bonded to the base metal 26. As can be seen from FIG. 3, a small slit 38 is plotted between a vertical rear end part of the cutting portion 24, and a vertical boundary end part, where the base portion 32 is transferred to the second base portion 34. An end part of an adhesive layer coated with the adhesive 30 is placed to face this slit 38.

In the cutting blade 28 bonding the cutting portion 24 to the base metal 26 by the adhesive 30, as described above, the second base portion 34 recessed in the base metal 26, and the third base portion 36 recessed in the cutting portion 26 are correspondingly aligned with each other, and the slit 38 faces the middle part of both base portions 34 and 36. Thus, as shown in FIG. 3, the second and third base portions 34 and 36 are commonly filled with a filler 40 having a resistance to water and/or a resistance to chemicals, and art adhesive layer exposed portion facing the slit 38 is fully covered. For this filler 40, an adhesive having a resistance to water and/or a resistance to chemicals, a silicon-containing caulking material or the like is suitably used. The adhesive as the filler 40 is required only to have a resistance to water or a resistance to chemicals selectively according to an environment of using the cutting blade 28, or both of resistances to water and chemicals. A magnitude of adhesive strength need not be considered uniquely.

According to the embodiment shown in FIG. 3, the slit 38 as the exposed portion of the adhesive 30 is covered with the filler 40 having filled the second and third base portions 34 and 36, and the filler 40 has a resistance to water and/or a resistance to chemicals. Thus, even if grind repairing (bevel face 28a is normally grinded) for the cutting blade 28 is repeated, little erosion by a grinding solution occurs in the adhesion 30 bonding the cutting portion 24 to the base metal 26, making it possible to maintain adhesive strength for a long time, and effectively prevent a reduction in reliability. A portion denoted by a reference code X in FIG. 3 is a filling line in a front side of the filler 40. If the cutting portion 24 is worn by long-time use of a cutter or frequent grind repairing, the filling line serves as a marking indicating a limit of use of the cutting portion 24. That is, according to the embodiment, the line in the front side of the filler 40 serves also as the marking to indicate the limit of use of the cutting portion 24.

Second Embodiment

Figure 4:
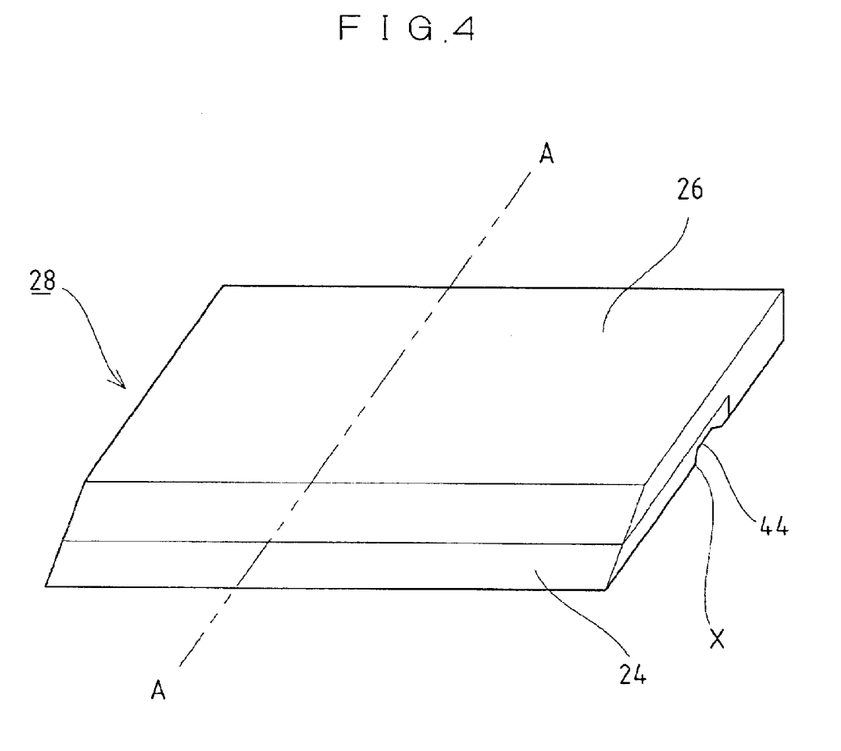
FIG. 4 is a perspective view of a bonded layer protection structure of a cutting blade according to a second embodiment.
Figure 5:
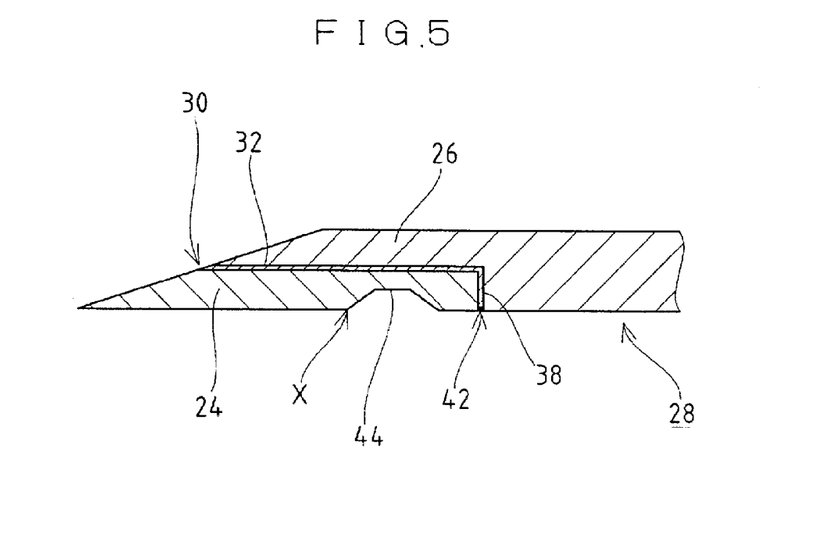
FIG. 5 is a sectional view taken along the line A—A of FIG. 4.

Each of FIGS. 4 and 5 shows a second embodiment of a cutting blade 28 as a wear resistant component, and a basic constitution is similar to that of the first embodiment. That is, the cutting blade 28 has a structure, where a plate-shaped cutting portion 24 is bonded to a base metal 26 by an adhesive 30. In the base metal 26, a base portion 32 is recessed to permit an entry of the cutting portion 24. A depth of this base portion 32 is set to a dimension slightly smaller than a thickness of the plate-shaped cutting portion 24. However, different from the constitution of the first embodiment, second and third base portions 34 and 36 are not recessed. Then, as shown in FIG. 5, bonding is carried out by pressing the cutting portion 24 from above the adhesive 30 coated on the base portion 32. In this case, a small slit 38 is formed between vertical front and rear end parts of the cutting portion 24, and an end part of an adhesive layer faces an open part of this slit 38. Thus, by filling or covering the open part of the slit 38 with a covering material 42 having a resistance to water and/or a resistance to chemicals, it is possible to prevent a grinding solution from coming into direct contact with the adhesive 30 in grind repairing. For the covering material 42 in this case, a coating material having a resistance to water and/or a resistance to chemicals, a metal foil material, a coating film such as a fluorocarbon resin, or a film by various platings can be suitably used.

In the cutting blade 28 of the second embodiment, as shown in FIG. 5, a concave groove 44 having a required width is recessed in a portion near the slit 38 in the backside of the cutting portion 24. A line X in a front side (tip side of the blade) of the concave groove 44 serves as a marking indicating a limit of use of the cutting portion 24, when the cutting portion 24 is worn by use of the cutter or grind repairing. Accordingly, a position for recessing the concave groove 44 is reasonably decided according to a bonding area, where necessary adhesive strength is provided by the adhesive 30 between the cutting portion 24 and the base metal 26. The concave groove is simply a marking, but it is not limited to such a concave groove, and a discontinuous groove, a single hole or the like may be used.

Third Embodiment

Figure 6:
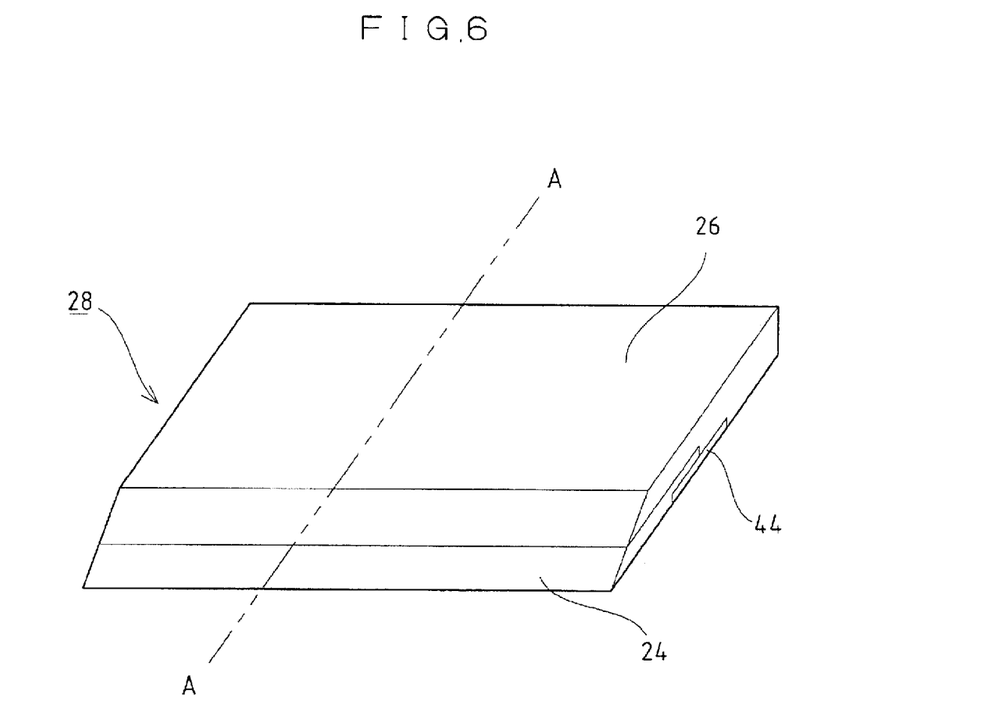
FIG. 6 is a perspective view of a bonded layer protection structure of a cutting blade according to a third embodiment.
Figure 7:
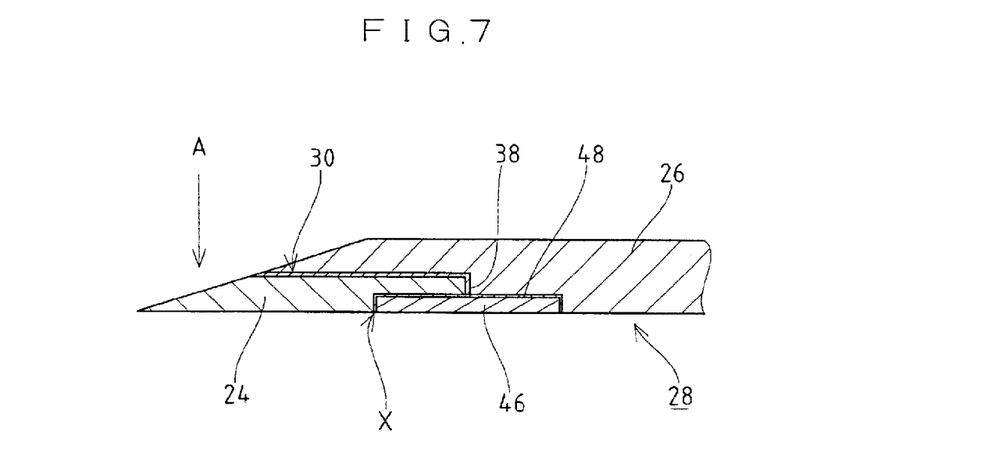
FIG. 7 is a sectional view taken along the line A—A of FIG. 6.

Each of FIGS. 6 and 7 shows a third embodiment of a cutting blade 28 as a wear resistant component, and a basic constitution is substantially similar to that of the first embodiment. Thus, structural differences between the two embodiments are as follows: (1) in the first embodiment, the second and third base portions 34 and 36 were commonly filled with the filler 40; and (2) in the third embodiment, a plate-like sticking member 46 having a resistance to water and/or a resistance to chemicals is stuck to second and third base portions 34 and 36 by an adhesive 48, and thus an adhesive layer exposed portion facing a slit 38 is covered. The adhesive 48 used in this case should preferably have a resistance to water and/or a resistance to chemicals, different from the above-described adhesive 30 mainly considering the adhesive strength, and adhesive strength is not a first consideration. For the sticking member 46, for example, a plate-like, bar-like or piece-like metal member or a synthetic resin material is suitably used.

According to the embodiment shown in FIG. 7, the slit 38 as the exposed portion of the adhesive 30 is covered with the sticking member 46 by the adhesive 48. Since this sticking member 46 has a resistance to water and/or a resistance to chemicals, even if grind repairing of the cutting blade 28 is repeated, little erosion by a grinding solution occurs in the adhesive 30 bonding the cutting portion 24 to the base metal 26, making it possible to maintain adhesive strength for a long time. A portion denoted by a reference code X in FIG. 7 is a front side line of the sticking member 46. This line serves as a marking indicating a limit of use of the cutting portion 24. Accordingly, by changing a plate width of the sticking member 46, the limit of use of the cutting portion 24 can be changed. By sticking the sticking member 46 (e.g., steel sheet piece having a thickness of 0.1 to 1.0 mm) having tensile strength of a certain level, as in the case of the third embodiment, adhesive strength of the cutting portion 24 with respect to the base metal 26, especially adhesive strength with respect to bending caused by a force of an arrow direction A (FIG. 7) applied on the tip of the blade, is reinforced. This fact has been verified by a series of experiments before reaching the present invention. This reinforcement may be more effective if the sticking member 46 having a certain width or more is used.

Fourth Embodiment

Figure 8:
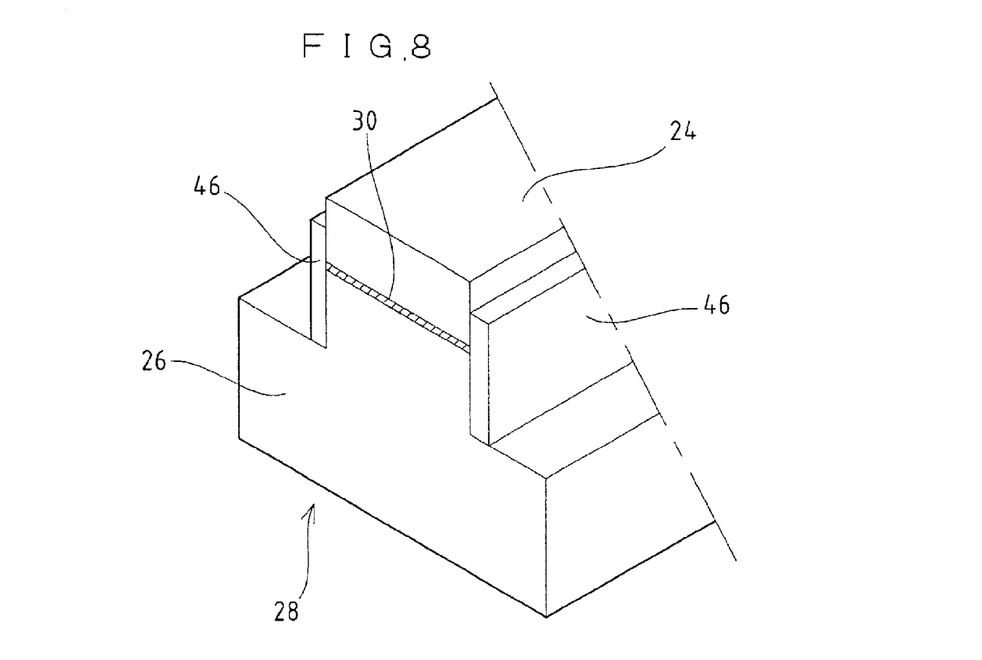
FIG. 8 is a perspective view of a slide rail according to a fourth embodiment, showing a state where a blade is bonded to an upper surface of the rail by an adhesive.

FIG. 8 shows a slide rail 28 as a wear resistant component according to a fourth embodiment. A blade 24 made of a sintered hard alloy or the like is bonded to an upper surface of a rail-shaped member 26 by an adhesive 30. A sticking member 46 made of, for example a metal plate, is stuck to an adhesive layer exposed portion of this slide rail 28, and thus the adhesive layer exposed portion is covered. Thus, by adjusting a plate width of the sticking member 46, a limit of use of the blade 24 in the slide rail 28 can be indicated. FIG.

Figure 9:
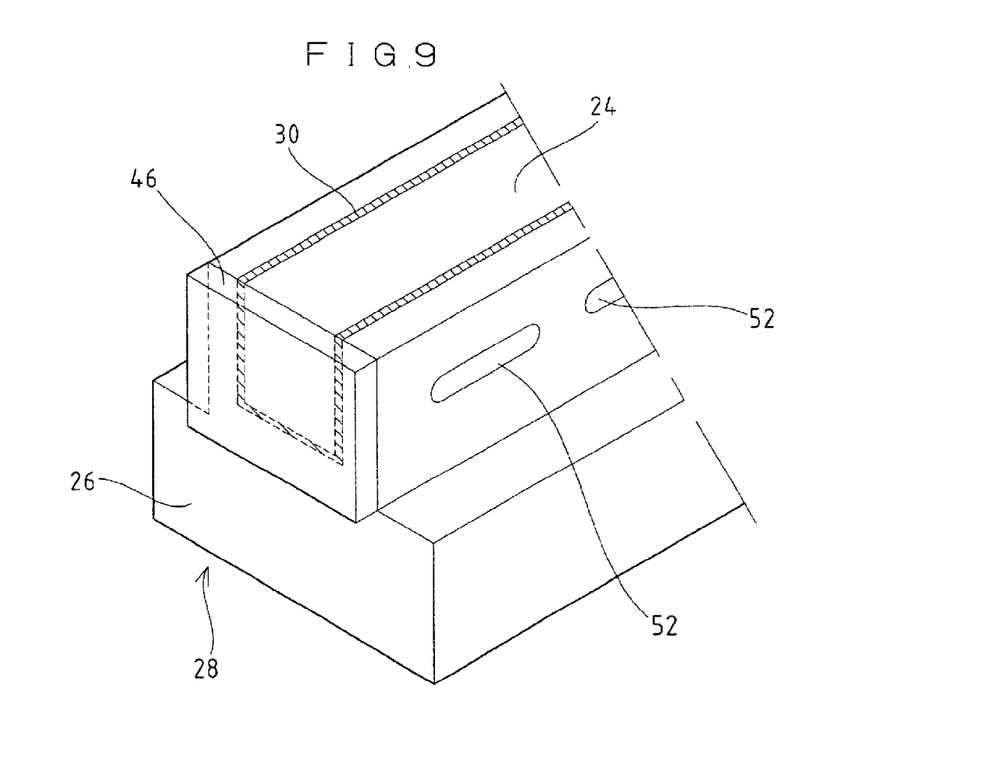
FIG. 9 is a perspective view of the slide rail of the fourth embodiment, showing a state where the blade buried in a concave groove of the rail is bonded by the adhesive.

9 shows a slide rail 28, which is constructed by burying the blade 24 in a concave portion 50 provided in the upper surface of the rail-shaped member 26, and bonding both members 26 and 24 together by an adhesive 30. In this case, by sticking a sticking member 46 made of a metal piece to an end of the slide rail 28, the adhesive layer exposed portion can be covered. Moreover, by separately providing a necessary marking 52, it is possible to indicate a limit of use of the blade 24.

Fifth Embodiment

Figure 10:
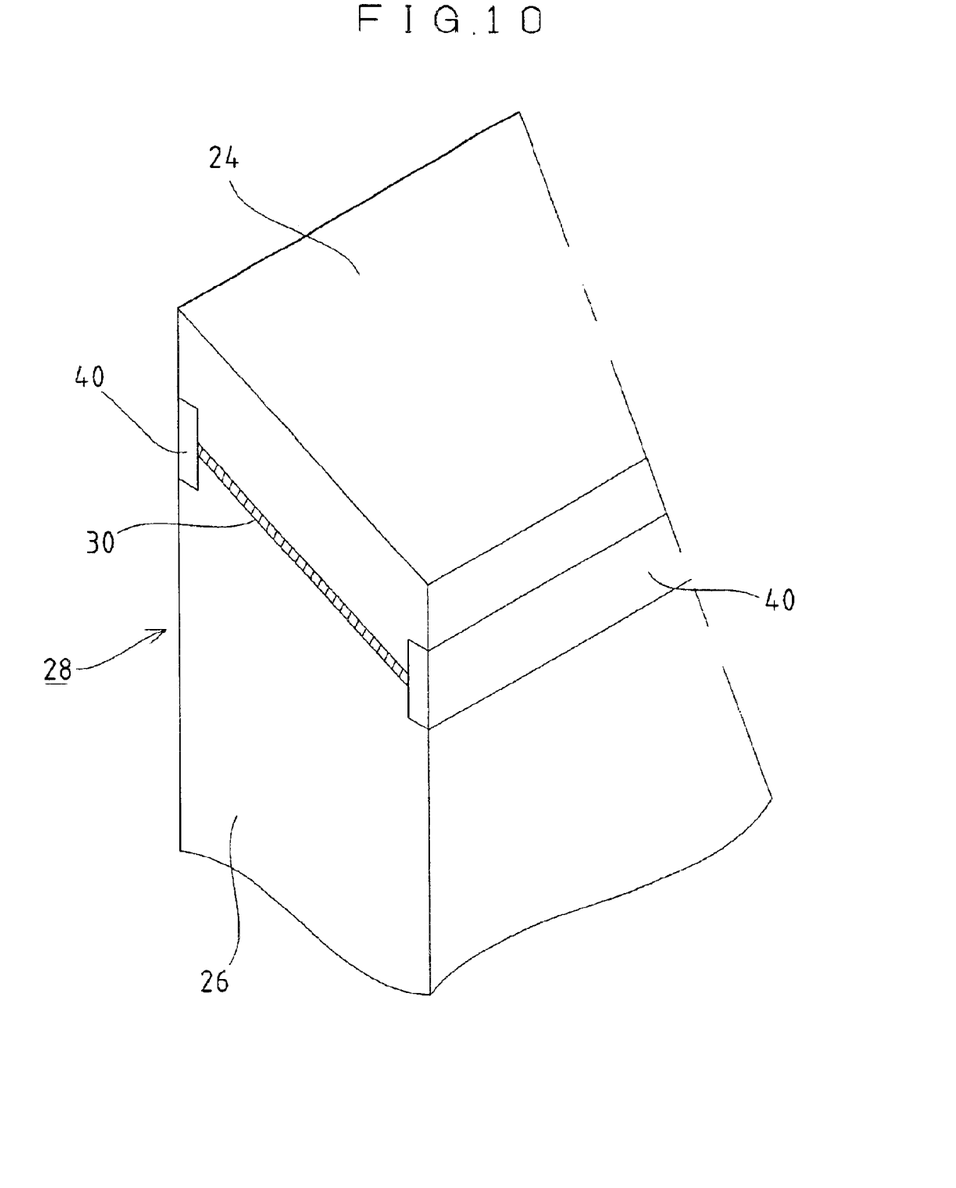
FIG. 10 is an enlarged perspective view showing a tip portion of a work rest according to a fifth embodiment.

FIG. 10 is an enlarged perspective view showing a tip portion of a work rest 28 for a centerless grinding machine according to a fifth embodiment. For example, a blade 24 made of a sintered hard alloy or the like is bonded to a top part of a rail-shaped member 26 made of common steel by an adhesive 30. Also in this case, a necessary part of an adhesive layer exposed portion in the blade 24 and the rail-shaped member 26 is covered with a filler 40 similar to an adhesive having a resistance to water and/or a resistance to chemicals.

What is claimed is:

1. A cutting blade (28) constructed by bonding a plate-shape cutting portion (24) to a base metal (26) with an adhesive (30), said cutting blade (28) comprising:
    a base portion (32) recessed in a backside of said base metal (26) so as to receive said cutting portion (24), a depth of said base portion (32) being less than a thickness of said cutting portion (24);
    a second base portion (34) recessed in said backside of said base metal (26) by a predetermined width and set to be continuous from said base portion (32), a depth of said second base portion (34) being less than that of said base portion (32);
    a third base portion (36) recessed in said backside of said cutting portion (24) by a predetermined width and set to a dimension of a depth equal to that of said second base portion (34) in a place aligned with said second base portion (34) when said cutting portion (24) is bonded to said base metal (26);
    a slit (38) plotted between a rear end part of said cutting portion (24) and a boundary end part where said base portion (32) is transferred to said second base portion (34), an end part of an adhesive layer coated with said adhesive (30) being placed to face said slit (38); and
    a filler (40) which is filled commonly in said second and third base portions (34) and (36) and fully covers an adhesive layer exposed portion facing said slit (38).

2. A cutting blade (28) constructed by bonding a plate-shape cutting portion (24) to a base metal (26) with an adhesive (30), said cutting blade (28) comprising:
    a base portion (32) recessed in a backside of said base metal (26) so as to receive said cutting portion (24), a depth of said base portion (32) being less than a thickness of said cutting portion (24);
    a slit (38) plotted between a rear end part of said cutting portion (24) and a front end part of said base portion (32), an end part of an adhesive layer coated with said adhesive (30) being placed to face said slit (38);
    a coveting material (42) which is provided in an open part of said slit (38) and cover an adhesive layer exposed portion; and
    a concave portion (44) recessed in a backside of said cutting portion (24) and in a portion on a front side of said slit (38), said concave portion (44) serving as a marking indicating a limit of use of said cutting portion (24) when said cutting portion (24) is worn by use.

3. A cutting blade (28) constructed by bonding a plate-shape cutting portion (24) to a base metal (26) with an adhesive (30), said cutting blade (28) comprising:
    a base portion (32) recessed in a backside of said base metal (26) so as to receive said cutting portion (24), a depth of said base portion (32) being less than a thickness of said cutting portion (24);
    a second base portion (34) recessed in said backside of said base metal (26) by a predetermined width and set to be continuous from said base portion (32), a depth of said second base portion (34) being less than that of said base portion (32);
    a third base portion (36) recessed in a backside of said cutting portion (24) by a predetermined width and set to a dimension of a depth equal to that of said second base portion (34) in a place aligned with said second base portion (34) when said cutting portion (24) is bonded to said base metal (26);
    a slit (38) plotted between a rear end part of said cutting portion (24) and a end part where said base portion (32) is transferred to said second base portion (34), an end part of an adhesive layer coated with said adhesive (30) being placed to face said slit (38); and
    a sticking member (46) stuck to said second and third base portions (34) and (36) by an adhesive (48), said sticking member (46) fully covering an adhesive layer exposed portion facing said slit (38).

* * * * *